United States Patent [19]

Namura et al.

[11] 4,292,103
[45] Sep. 29, 1981

[54] TRANSFER PRINTING

[75] Inventors: Shigekazu Namura; Takao Sumi, both of Kyoto, Japan

[73] Assignee: Nissha Printing Co., Ltd., Japan

[21] Appl. No.: 119,029

[22] Filed: Feb. 6, 1980

[30] Foreign Application Priority Data

Feb. 13, 1979 [JP] Japan ................................. 54/15918

[51] Int. Cl.$^3$ .................... B41M 3/12; B44C 1/16; B41M 5/26
[52] U.S. Cl. .................... 156/230; 156/234; 156/237; 156/240; 427/203; 427/261; 427/269; 427/287; 427/376.2; 428/204; 428/207; 428/210; 428/306; 428/308; 428/331; 428/913; 428/914
[58] Field of Search .................. 8/467, 468; 156/230, 156/234, 235, 237, 240, 241, 249, 277; 427/203–205, 261, 269, 287, 376.2, 402, 407.2; 428/195, 206–210, 306–309, 328, 329, 331, 446, 450, 457, 469, 913, 914, 203, 204

[56] References Cited

FOREIGN PATENT DOCUMENTS

| 54-62 | 1/1979 | Japan | 428/195 |
| 54-101814 | 8/1979 | Japan | 428/210 |

Primary Examiner—Bruce H. Hess
Attorney, Agent, or Firm—Fidelman, Wolffe & Waldron

[57] ABSTRACT

A method of transfer printing wherein an adsorptive porous layer of activated alumina or silica or a mixture thereof is formed on the surface of an object to be colored or printed, and a transfer material comprising a carrier sheet and a design layer formed thereon and containing colorants forming a colored pattern is applied to the adsorptive porous layer of the object, and the carrier sheet is stripped away so that the design layer is left adhered to the adsorptive porous layer, and then heat is applied to cause the colorants in the design layer to migrate into the porous layer for exact reproduction of the colored pattern thereon.

16 Claims, 10 Drawing Figures

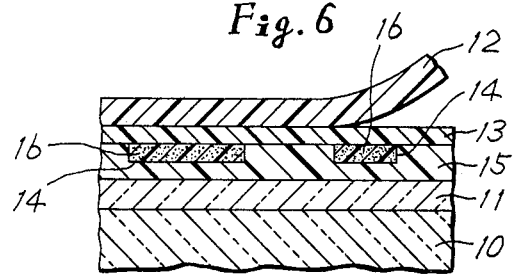
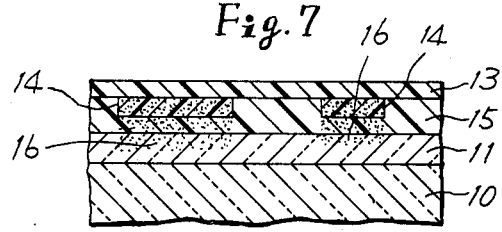
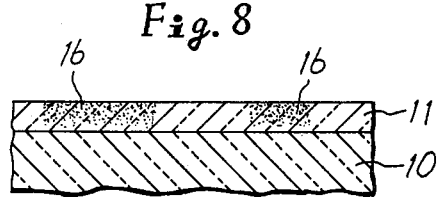

TRANSFER PRINTING

This invention relates to transfer printing and more particularly to a method of producing delicate and complex multicolor patterns on an object of heat-resistant material by first forming an adsorptive porous layer on the surface of the object and then printing desired multicolor patterns on the porous layer by means of transfer material. The invention also relates to articles having multicolor patterns printed by the method.

There have been proposed several methods of producing multicolor patterns on various objects. One method involves coating the surface of an object or article with a resinous material and printing a desired pattern on the coated surface by sublimation transfer; another method involves forming a layer of γ-alumina on an object of inorganic or metallic material and printing a desired pattern on the γ-alumina layer by sublimation transfer; and a third method involves anodizing the surface of an object of aluminum or aluminum alloy and applying to the anodized surface a design layer containing a desired pattern formed by suitable dyes and then dry- or wet-heating the applied layer so as to transfer the dyes to the anodized surface.

The above-mentioned methods, however, have various disadvantages. Indeed, the first method has an advantage that an appropriate resinous material can render the printed surface relatively highly resistant to acid and/or alkali. However, resinous materials are inherently relatively low in abrasion resistance, so that the printed surface is apt to be damaged or broken. Moreover, according to this method the transfer sheet is kept in contact with the surface to be printed, that is, the surface coated with resinous material while transfer is being performed by heating and pressing the transfer sheet so as to vaporize the sublimable colorants contained therein to be transferred to the coated surface. When heat and pressure are applied, the transfer sheet is likely to be expanded or contracted or displaced relative to the surface to be printed with resulting distortion or blurring of the transferred pattern. Since dyeing is accomplished through sublimation of the dyes, the transfer sheet and the article to be printed must be held together for a relatively long time. This renders the method unsuitable for mass production. The colorants that can be used in this method are sublimable dyes only.

According to the second method, colloidal alumina is applied to an object made of a heat-resistant material, and after sintering the alumina layer desired letters and/or patterns are formed on the sintered alumina layer by sublimation transfer, that is, vaporizing sublimable colorants by application of heat and pressure so as to fix the colorants to the sintered alumina layer. This second method has an advantage that the alumina layer increases the surface resistance of the object to abrasion and various chemicals, but it has disadvantages similar to those the first method has.

According to the third method, since the design layer of a transfer material is held in close contact with the anodized aluminum or aluminum alloy surface of an object to be printed without any gap therebetween, displacement seldom occurs between the design layer and the anodized surface so that it is possible to transfer print very delicate and complicated patterns. Furthermore, the method is suitable for mass production.

The third method, however, has the following disadvantages. Since it is necessary to form an anodized layer on the surface of an object to be printed, it must be of aluminum or aluminum alloy. If a transfer process has failed on an object, it is possible to remove the transferred layer from the anodized surface of the object and then again conduct a new transfer process on the same surface. However, since the anodized aluminum surface is highly receptive of dyes in liquid solution, the dyes in the transferred layer are likely to be dissolved in the solvent to stain the anodized aluminum surface of the object unless much care is taken in selecting the kind of solvent to be used for removing the transferred layer.

Alternatively, the anodized aluminum layer itself is removed by alkali aqueous solution, and the exposed aluminum surface is again anodized so that transfer printing is conducted on the newly anodized surface. This method, however, has the difficulty that alkali aqueous solution is apt to dissolve the aluminum substrate itself so that this method can not be used for articles such as the cap of a container which requires high dimensional precision with respect to the inner and outer diameters.

In an effort to overcome the above-mentioned and other disadvantages of the prior art methods the present inventors have conducted various studies and experiments and found out that by thermal migration as well as sublimation it is possible to dye the activated alumina or silica or alumina-silica layer formed on an object made of a heat-resistant material by sintering colloidal alumina or colloidal silica or a mixture thereof previously applied to the surface of the object.

It is, therefore, one object of the invention to provide a method of transfer printing wherein an absorptive porous layer of activated alumina or silica or a mixture thereof is formed on the surface of an object to be printed or colored, and a heat- and pressure-sensitive transfer material which comprises a carrier sheet and a design layer formed thereon and containing thermo-diffusible colorants is applied to the adsorptive porous layer of the object, and after removing the carrier sheet from the transfer material heat is applied to cause the colorants to migrate from the design layer into the porous layer of the object, and then the remnants of the transfer material are removed so that the multicolor pattern that previously existed in the design layer is very clearly and beautifully transfer-printed on the surface of the object.

Another object of the invention is to provide an article which is coated with an adsorptive porous layer in the pores of which colorants are fixed to provide coloration of the layer and/or formation of a colored pattern thereon.

The invention will be described in detail with reference to the accompanying drawings, wherein:

FIG. 5 is a schematic cross-sectional view of a portion of an object to be transfer-printed by the method of the invention;

FIGS. 6 through 8 are schematic cross-sectional views for explanation of the method of the invention;

Figure 1:
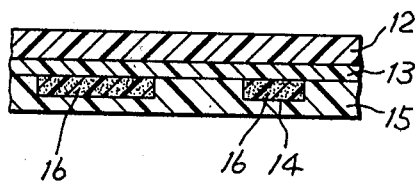
FIGS. 1 through 4 are schematic cross-sectional views of different types of transfer material to be used in the method of the invention.

Referring to the drawings, there is schematically shown in FIG. 5 a portion of an object or article 10 on the surface of which a desired pattern is to be formed by transfer printing. The article 10 is of a heat-resistant material such as glass, tile, enamel, pottery, stainless steel, red brass, etc. The receiving surface of the article is coated with colloidal alumina or colloidal silica or a mixture thereof in any known manner, and the coating is dried to evaporate the water contained therein. The drying may be conducted at room temperature or by positive heating.

If desired, 1 to 100 parts by weight of a water-soluble resin may be added as a binder to 100 parts by weight of the solid portion of the colloidal solution so as to improve the coating adaptability and film-forming ability of the colloidal solution. It is preferred that after sintering the resin should leave no ash. Examples of the resin are polyvinyl alcohol, polyvinyl pyrrolidone, methyl cellulose, hydroxypropyl cellulose, polyethylene oxide, denatured vinyl acetate, etc.

The dried coating of colloidal alumina or colloidal silica or a mixture thereof is then sintered at 280° C. to 1200° C. for 15 minutes to 60 minutes so that a layer 11 of activated alumina or silica or a mixture thereof is formed on the object 10. The layer 11 is highly porous and adsorptive and will be referred to as the adsorptive porous layer or briefly the porous layer.

A heat- and pressure-sensitive transfer material which comprises a carrier sheet and a design layer formed thereon and containing thermo-diffusible colorants is applied to the surface of the porous layer 11 formed on the object 10. Then the carrier sheet of the transfer material is stripped off from the design layer so that the design layer is left on the surface of the porous layer 11 of the object 10. Under the condition the design layer yet containing the pattern is temporarily adhered to the surface of the porous layer so that no relative displacement is likely to occur between the two layers. This makes it possible for the object thus far treated to be transported for subsequent treatment to a different place from where the previous treatment has been conducted on the object.

Heat is then applied to the design layer at a temperature and for a period of time sufficient for the colorants in the design layer to migrate into the porous layer to exactly reproduce thereon the coloration and/or pattern that has previously been in the design layer. The temperature is 100° C. to 250° C. and preferably 160° C. to 230° C. and the time is 1 minute to 60 minutes and preferably 2 minutes to 30 minutes.

Examples of the transfer material are shown in FIGS. 1 to 4. In FIG. 1, the transfer material comprises a carrier sheet 12, a stripping layer 13, a design layer 14 and an adhesive layer 15 formed successively one upon another.

The carrier sheet 12 is made of a heat-resistant plastic material such as polyester, cellophane, etc. or parchment paper and can be a single sheet or a laminated assembly of two or more of them. The stripping layer 13 may be formed on the carrier sheet 12 by coating the whole surface of the carrier sheet with a solution of a suitable resin such as polymethyl methacrylate which renders the carrier sheet 12 capable of being stripped off from the other layers of the transfer material.

The design layer 14 may be printed on the stripping layer 13 by gravure, silk screen, or any other known printing techniques with an ink containing thermo-diffusible colorants 16 capable of dyeing the porous layer 11 so that a desired pattern is formed in the design layer 14.

The adhesive layer 15 may be printed with an adhesive comprising a synthetic resin which is activated upon application of heat and pressure thereto so as to be temporarily adhesive to the porous layer.

Figure 2:
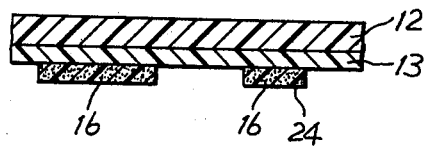

In FIG. 2, instead of the design layer 14 and the adhesive layer 15 in FIG. 1, an adhesive design layer 24 containing a desired colored pattern is formed on the stripping layer 13.

Figure 3:
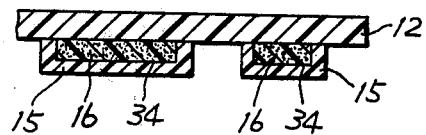

In FIG. 3, the design layer 14 and the stripping layer 13 in FIG. 1 are replaced by a design layer 34 formed directly on the carrier sheet 12 and an adhesive layer 15 covering the design layer 34. The design layer 34 is releasable from the carrier sheet 12 and the adhesive layer 15 is of a synthetic resin which can temporarily be adhered under heat and pressure to the porous layer 11. The adhesive layer 15 may be partially applied to cover the design layer 34 alone as shown in FIG. 3 or the whole surface of the carrier sheet 12 including the design layer 34.

Figure 4:
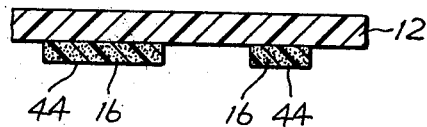

In FIG. 4, the transfer material comprises a carrier sheet 12 and a design layer 44 printed directly thereon with an ink made of a synthetic resin containing thermo-diffusible colorants. The design layer 44 is releasable from the carrier sheet 12 on one hand and can temporarily be adhered under heat and pressure to the porous layer 11 on the other.

The thermo-diffusible colorants used in the design layers 14, 24, 34, 44 of the transfer material can be any of those capable of thermal migration by dry- or wet-heating, such as for example disperse dyes, solvent dyes, basic dyes, acid dyes, metal complex dyes, vat dyes, spirit dyes, mordant dyes, acid mordant dyes, etc.

As shown in FIG. 6 the transfer material comprising the carrier sheet 12, the stripping layer 13, the design layer 14 and the adhesive layer 15 is put on an article 10 made of a heat-resistant material on which transfer printing is to be performed, with the adhesive layer 15 of the transfer material being in contact with the porous layer 11 of the article 10. Then pressure and heat are applied to force the transfer material against the article 10. When a roll-type heat transfer machine is used, preferably the surface temperature of the roller is 160° C. to 250° C. and the production speed is 5 cm/sec to 15 cm/sec.

Then the carrier sheet 12 is stripped away leaving the other layers 13, 14 and 15 transferred to the porous layer 11 of the article 10. Then dry- or wet-heating treatment is conducted on these transferred layers to cause the thermo-diffusible colorants 16 contained in the design layer 14 to migrate into the porous layer 11 thereby to reproduce the pattern that previously existed in the design layer at the corresponding position on the porous layer 11 as shown in FIG. 8.

Then the transferred layers 13, 14 and 15 that have now become unnecessary on the porous layer 11 of the article 10 are dissolved away by a suitable solvent such as trichloroethylene, or cold or hot water.

As described above in detail, in accordance with the invention an adsorptive porous layer of activated alumina or silica or a mixture thereof is formed on the surface of an object made of a heat-resistant material, and a transfer material comprising a carrier sheet and a design layer containing thermo-diffusible colorants forming a multicolor pattern is applied to the porous surface of the object, and the carrier sheet of the transfer material is stripped away and then heat is applied so as to cause the colorants to migrate from the design layer into the porous layer to reproduce the multicolor pattern thereon. In other words, the design layer 14 of the transfer material with the other layers 13 and 15 if provided is once transferred to the porous layer of the receiving object. Under the condition the object has the pattern in the design layer preliminarily transfer-printed on the porous surface thereof. Then heat is applied to drive the colorants forming the pattern into the porous layer to cause the pattern to be fixedly transfer-printed in the porous layer and consequently on the surface of the object. The two-step transfer process eliminates all the disadvantages of the prior art methods and enables accurate and beautiful reproduction of delicate and complex patterns on an object or article. The method of this invention is suitable for mass production because it enables continuous transfer operation. A wide variety of heat-diffusible colorants can be used in the method of the invention.

In accordance with the invention, if a transfer operation fails, little or no loss is caused to the article. The design layer containing the pattern to be transferred and other associated layers are once transferred to the surface of the porous layer of a receiving article so as to be temporarily held thereon and then the transferred layers are heated to transfer the pattern from the design layer to the porous layer of the receiving article. This enables the very delicate and complex original pattern in the design layer of the transfer material to be accurately transfer-printed on the receiving porous surface of the article without such blurring or overlapping of the transfer-printed pattern as often occurred in the previously mentioned first and second conventional methods.

With respect to working efficiency, the first and second methods employ transfer material in the form of separate transfer sheets so that it is impossible to perform transfer operation continuously. On the contrary, the method of this invention employs a roll of a continuous sheet of transfer material so that it is possible to conduct transfer operation continuously, and this makes the method of the invention particularly suitable for mass production. Thus all the disadvantages of the conventional methods have been overcome by the invention.

The porous layer is hardly receptive of colorants in liquid solution. Therefore, if a transfer operation has failed before thermal migration of the pattern-forming colorants, the transferred layer or layers on the porous layer of a receiving article can be wiped away with a suitable solvent which can dissolve the binder of the layers, so that a new transfer operation can be conducted on the wiped surface of the porous layer of the receiving article.

After the transferred layers have been removed from the porous layer of the receiving article onto which the pattern has been transferred from the design layer of the transfer material, if the transferred pattern is found inferior in quality, the porous layer may be heated to decompose the colorants that have migrated into the porous layer and clean the layer of the decomposed substances, so that a new transfer operation may be conducted on the cleaned porous layer again. This means that few or no inferior products will be produced by the method of the invention and that the disadvantages of the previously mentioned third conventional method have been successfully overcome.

The surface that has been transfer-printed by the method of this invention has a pencil hardness of more than 9 points and also a high corrosion resistance to acid, alkali and other chemicals.

The method of the invention can advantageously be applied to a wide variety of objects such as building materials, especially boards such as interior pannels, metal or glass containers for cosmetic, articles for interior decoration such as lamp shades, name plates, enameled ware, pottery, etc.

Some examples of the method of the invention will be given below for better understanding thereof. The letters given in parentheses after the names of the colorants or other compounds in the following description indicate a commercial source of the compounds as follows:

"KYK" indicates Nihon Kayaku Kabushikikaisha, Tokyo, Japan.

"HERCULES" indicates Hercules Incorporated, Wilmington, Del., U.S.A.

"TAKEDA" indicates Takeda Chemical Industries, Ltd., Osaka, Japan.

"BASF" indicates Badische Anilin & Soda Fabrik A.G., West Germany.

EXAMPLE 1

A transparent glass is dipped in a bath of a 10 weight percent colloidal alumina dispersion in water to provide a coating thereon, which is dried at 100° C. for 20 minutes and then sintered at 550° C. for one hour so that the glass is coated with a transparent activated alumina layer.

On the other hand, a laminate of polyester and polypropylene films is provided, and on the polypropylene surface of the laminate a design layer including a flower pattern is printed by the gravure process with gravure inks of the following compositions (a) to (c), and then on the design layer an adhesive layer is printed with an ink of the following composition (d) to produce a transfer material.

|     |                              | Parts by weight |
|-----|------------------------------|-----------------|
| (a) | Kayaset Flavin FP (KYK)      | 5               |
|     | Ethyl cellulose N-10 (HERCULES) | 6            |
|     | Pentalyn 858 (HERCULES)      | 6               |
|     | Toluene                      | 67              |
|     | Methyl alcohol               | 16              |
| (b) | Kayaset Red B (KYK)          | 7               |
|     | Ethyl cellulose N-10 (HERCULES) | 6            |
|     | Pentalyn 858 (HERCULES)      | 6               |
|     | Toluene                      | 65              |
|     | Methyl alcohol               | 16              |
| (c) | Kayaset Blue-TDR (KYK)       | 8               |
|     | Ethyl cellulose N-10 (HERCULES) | 6            |
|     | Pentalyn 858 (HERCULES)      | 6               |
|     | Toluene                      | 64              |
|     | Methyl alcohol               | 16              |
| (d) | Takerack U-302 (TAKEDA)      | 30              |
|     | Methyl ethyl ketone          | 70              |

The transfer material produced is applied to the sintered alumina surface of the transparent glass, and a roll-type heat transfer machine is run at a roller temperature of 210° C. and a speed of 12 cm/sec. Then the carrier sheet of the transfer material is stripped away to leave the design and adhesive layers on the surface of the glass, which is then heated at 200° C. for 13 minutes in a dry oven. Then the remnants on the surface of the glass are rinsed away so that a transparent glass having a beautiful flower design printed on the surface thereof is obtained.

EXAMPLE 2

A solution of the following composition is sprayed to a white tile to provide a coating thereon, which is dried at 100° C. for 20 minutes and then sintered at 650° C. for 1 hour to form an activated alumina layer on the tile.

|  | Parts by weight |
| --- | --- |
| Colloidal alumina | 30 |
| Polyethylene oxide | 1 |
| Methanol | 69 |

The colloidal alumina is 10 weight percent colloidal alumina dispersion in water.

The tile is then treated in the same manner as in Example 1, so that a beautiful flower design is produced on the tile. Using a pencil hardness tester a hardness test is conducted on the tile. There is no scratch at all caused by a 9H pencil.

EXAMPLE 3

A bottle of milky glass has its cylindrical outer surface coated with a solution of the following composition by screen printing with a 100-mesh screen. The coating is dried at 100° C. for 20 minutes and then sintered at 500° C. for 1 hour to form an activated alumina layer on the tile.

|  | Parts by weight |
| --- | --- |
| Colloidal alumina | 80 |
| Methyl cellulose | 1 |
| Water | 19 |

The colloidal alumina is 10 weight percent colloidal alumina dispersion in water.

A mixture of the following composition (a) is applied to a carrier sheet of polyester film 25 μm thick to form a stripping layer thereon, on which a design layer is printed with gravure inks of the following compositions (b) to (d), and an adhesive layer is formed on the design layer with a mixture of the composition (e) to form a transfer material.

|  |  | Parts by weight |
| --- | --- | --- |
| (a) | Polymethyl methacrylate | 20 |
|  | Toluene | 80 |
| (b) | Neozapon Yellow GR (BASF) | 10 |
|  | Ethyl cellulose N-10 (HERCULES) | 5 |
|  | Pentalyn 858 (HERCULES) | 5 |
|  | Toluene | 64 |
|  | Methanol | 16 |
| (c) | Neozapon Red GR (BASF) | 10 |
|  | Ethyl cellulose N-10 (HERCULES) | 6 |
|  | Pentalyn 858 (HERCULES) | 6 |
|  | Toluene | 67 |
|  | Methanol | 16 |
| (d) | Neozapon Blue FLE (BASF) | 10 |
|  | Ethyl cellulose N-10 (HERCULES) | 6 |
|  | Pentalyn 858 (HERCULES) | 6 |
|  | Toluene | 67 |
|  | Methanol | 16 |
| (e) | Polyamide resin | 20 |
|  | Toluene | 45 |
|  | Isopropyl alcohol | 35 |

The transfer material is applied to the circumferential surface of the bottle and a roll-type heat transfer machine is run at a speed of 9 cm/sec with the surface temperature of the roller at 200° C. The carrier sheet is then stripped off to leave the stripping layer, the design layer and the adhesive layer on the surface of the bottle, which is then heated at 230° C. for 15 minutes in a dry oven to transfer the pattern in the design layer of the transfer material to the activated alumina layer of the bottle. Finally, the surface of the bottle is cleaned by trichloroethylene of the layers remaining thereon, whereupon the bottle appears with the pattern clearly and beautifully transfer-printed on the surface thereof.

EXAMPLE 4

A bottle of milky glass is treated in the same manner as in Example 3 to form an activated alumina layer on the whole outer surface thereof, and a transfer material as employed in Example 1 is applied to the activated alumina surface of the bottle. The bottle with the transfer material thereon is treated in the same manner as in Example 1 so that the design and adhesive layers of the transfer material cover the bottle. Using a high temperature steamer the bottle is heated at 190° C. for 10 minutes, and the layers remaining on the activated alumina surface of the bottle are wiped away by trichloroethylene, whereupon the bottle appears with the beautiful pattern transfer-printed on the surface thereof.

EXAMPLE 5

10 weight percent colloidal silica dispersion in water is sprayed on a bottle of transparent glass to form a coating thereon, which is dried at 100° C. for 20 minutes and then sintered at 400° C. for 1 hour. The bottle remains transparent covered with a layer of activated silica.

Transfer printing is conducted on the glass bottle in the same manner as in Example 1 so that a transparent bottle with a beautiful flower pattern is obtained.

EXAMPLE 6

A bottle of transparent glass is dipped in a bath of a mixture of colloidal alumina and colloidal silica at the ratio of 9 to 1 to provide thereon a coating, which is treated in the same manner as in Example 1. Transfer printing is conducted in the same manner as in Example 1, so that a bottle with a beautiful flower pattern is obtained.

Figure 9:
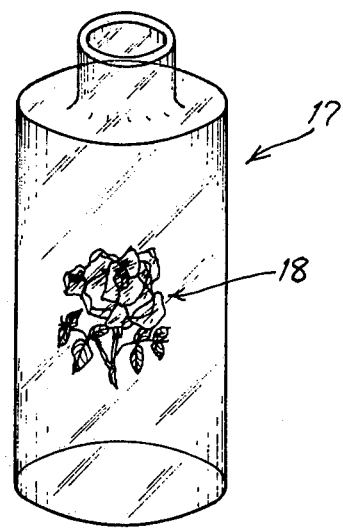
FIG. 9 is a perspective view of a glass bottle having a flower pattern transfer-printed by the method of the invention.
Figure 10:
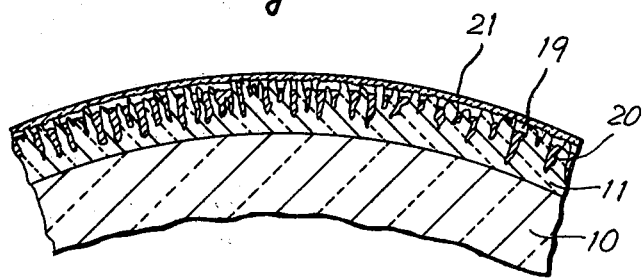
FIG. 10 is a schematic enlarged cross-sectional view of a portion of the bottle shown in FIG. 9.

FIG. 9 shows a bottle 17 of transparent glass with a colored flower pattern 18 transfer-printed on the outer surface of the circumferential wall thereof by the method of the invention. As shown in FIG. 10, the glass wall 10 of the bottle 17 is provided at the outer surface thereof with a porous layer 11 of activated alumina or silica or mixture thereof formed as in any of the previously mentioned examples.

The colored pattern 18 is printed with a suitable ink containing thermo-diffusible dyes, the particles of which have migrated into the very minute cavities or pores 19 of the porous layer 11 to be fixed therein as shown at 20. A protective coating 21 is formed on the porous layer 11 to seal the pores 19. The coating 21 may be of any suitable thermosetting transparent synthetic resin such as melamine or acrylic resin, which is applied to the porous layer 11 and cured by heating. The coating is to seal the pores 19 thereby to prevent decoloring of the pattern. To this end a very thin coating suffices.

When factors such as transparency, surface hardness, receptivity of dyes are taken into consideration, the porous layer 11 preferably is 2 μm to 3 μm thick. If the porous layer is thicker, it becomes matted or milky, while if it is less thick, it becomes impossible to receive a sufficient amount of dye.

The article which has been colored or provided with a colored pattern by the method of the invention has various advantages such as follows: Since the porous surface layer which has been colored or formed with a colored pattern is transparent, it is possible to obtain a transparent multicolor pattern while making the most of the characteristics of the material of the substrate. Since the colored porous layer covering the article is made of activated alumina or silica or a mixture thereof, the layer is superior in physical properties such as surface hardness, abrasion resistance, weatherability and color fastness. Since the coloration or pattern is formed of thermo-diffusible dyes, it is possible to transfer print delicate and complex patterns of continuously varying hues and/or gradation thereby to give the articles a higher decorative value than has ever been attained by the conventional methods of transfer printing.

What we claim is:

1. A method of coloring the surface of an object of heat-resistant material, comprising the steps of:
    applying colloidal alumina, colloidal silica or a mixture thereof to the surface of said object;
    drying said applied alumina, silica or mixture thereof;
    sintering said alumina, silica or mixture thereof at 350° C. to 800° C. for 15 minutes to 180 minutes to form an adsorptive porous layer of activated alumina, silica or mixture thereof on the surface of said object;
    applying to said adsorptive porous layer a transfer material including a carrier sheet and a design layer formed on said carrier sheet releasably therefrom and containing heat-diffusible colorants;
    stripping said carrier sheet away from the remainder of said transfer material so as to leave at least said design layer adhered to said adsorptive porous layer of said object;
    heating said design layer at 100° C. to 250° C. for 1 minute to 60 minutes so as to cause said colorants in said design layer to migrate into said adsorptive porous layer to be fixed therein; and
    removing the remnants of said transfer material from said porous layer.

2. The method of claim 1, wherein said heat-resistant material is a material selected from the group consisting of glass, ceramic and metal.

3. The method of claim 1, wherein said colloidal alumina contains a water soluble resin.

4. The method of claim 1, wherein said colloidal silica contains a water soluble resin.

5. The method of claim 1, wherein said carrier sheet of said transfer material is made of a material selected from the group consisting of paper, cellophane, polyester and polypropylene.

6. The method of claim 1, wherein said design layer is printed on said carrier sheet by one of the gravure and screen printing methods.

7. The method of claim 1, wherein said colorants form a predetermined multicolor pattern in said design layer, said pattern being reproduced in said porous layer when said colorants have migrated into said porous layer.

8. The method of claim 1, wherein said colorants are selected from the group consisting of disperse dyes, solvent dyes, basic dyes, acid dyes, metal complex dyes, vat dyes, spirit dyes, mordant dyes and acid mordant dyes.

9. The method of claim 1, wherein said design layer is printed directly on said carrier sheet with an ink comprising a resin which is releasable from said carrier sheet and which is releasably adhesive to said adsorptive porous layer, said colorants being mixed with said resin.

10. The method of claim 1, wherein said design layer is printed directly on said carrier sheet with an ink comprising a resin which is releasable from said carrier sheet, said colorants being mixed with said resin, and wherein said transfer material further includes an adhesive layer formed on said design layer and comprising a resin which is releasably adhesive to said adsorptive porous layer.

11. The method of claim 1, wherein said transfer material further includes a stripping layer between said carrier sheet and said design layer.

12. The method of claim 11, wherein said transfer material further includes an adhesive layer on said design layer.

13. The method of claim 11, wherein said design layer is printed on said stripping layer with an ink comprising a resin which is releasably adhesive to said adsorptive porous layer, said colorants being mixed with said resin.

14. The method of claim 1, wherein said heating step is conducted at 100° C. to 250° C. for 1 minute to 60 minutes, preferably 160° C. to 250° C. for 2 minutes to 30 minutes.

15. The method of claim 1, further including the step of providing said porous layer with a protective coating of a transparent synthetic resin.

16. An article having a colored pattern for decoration comprising:
    a basic member formed of a heat resistant material in a predetermined shape;
    an adsorptive, porous layer formed on the surface of such basic member, with colorants fixed in the pores of said porous layer to effect coloration of said layer or formation of said colored pattern on said layer; and
    a protective coating on the surface of said porous layer to seal said pores, said coloration of said porous layer or formation of said colored pattern being effected by the method of claim 1.

* * * * *